United States Patent
Ponson et al.

(12)

(10) Patent No.: US 6,189,670 B1
(45) Date of Patent: *Feb. 20, 2001

(54) DEVICE FOR OPERATING A CLUTCH WITH AN ELASTIC SELF-ALIGNMENT MEMBER

(75) Inventors: Frederic Ponson, Luynes; Jean Michel Kromwel, Amiens, both of (FR)

(73) Assignees: SKF France, Clamart; Valeo, Paris, both of (FR)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/018,889

(22) Filed: Feb. 5, 1998

(30) Foreign Application Priority Data

Feb. 13, 1997 (FR) .................................... 97 01694

(51) Int. Cl.[7] .............................. F16D 19/00; F16D 21/00
(52) U.S. Cl. ........................................ 192/85 CA; 192/98
(58) Field of Search ............................ 192/85 CA, 91 A, 192/98

(56) References Cited

U.S. PATENT DOCUMENTS

| | | | |
|---|---|---|---|
| 4,077,504 | * | 3/1978 | Ernst et al. ............................. 192/98 |
| 5,113,988 | * | 5/1992 | Caron ..................................... 192/98 |
| 5,205,387 | * | 4/1993 | Checa .............................. 192/85 CA |
| 5,743,370 | * | 4/1998 | Thomire .......................... 192/85 CA |

FOREIGN PATENT DOCUMENTS

| | | | |
|---|---|---|---|
| 2045380 | * | 10/1980 | (GB) ..................................... 192/98 |
| 2107818 | * | 5/1983 | (GB) ..................................... 192/98 |

* cited by examiner

*Primary Examiner*—Charles A Marmor
*Assistant Examiner*—Roger Pang
(74) *Attorney, Agent, or Firm*—Smith, Gambrell & Russell, LLP

(57) ABSTRACT

Device for operating a clutch of the type comprising a thrust ball bearing 16, equipped with a non-rotating race 17 and with a rotating race 18, capable of acting on a diaphragm of a clutch mechanism 21, an operating element 11 comprising a tubular portion 13 and a radial flange 14, which can move axially along a guide tube 6, and an elastic self-alignment member arranged radially between the thrust ball bearing 16 and the tubular portion 13 of the operating element 11. The elastic self-alignment member comprises an annular scraping lip 28 which rubs against the guide tube 6 to form a scraping seal.

11 Claims, 2 Drawing Sheets

DEVICE FOR OPERATING A CLUTCH WITH AN ELASTIC SELF-ALIGNMENT MEMBER

The present invention relates to the field of clutch-release bearings, particularly for motor vehicles.

In general, clutch-release bearings comprise an operating member which can move in terms of translation on a guide tube under the action of a control member such as a clutch-release fork or the piston of a hydraulically controlled system, a thrust ball bearing intended to act on the clutch-release device of a clutch, such as a diaphragm and, between the thrust ball bearing and the operating element, a self-centering connection providing the axial connection between the thrust ball bearing and the operating element and allowing the thrust ball bearing to self-centre with respect to the diaphragm should the axis of the diaphragm and the axis of the thrust ball bearing not be exactly concurrent at the time of assembly.

The operating element may, on its free end, have a scraping seal. This scraping seal may serve to prevent dirt from getting in between the parts that can move relative to one another in translation. The problem is that a build up of assorted dirt between the guide tube and the operating element has detrimental effects on the correct operation of the mechanism because of the increase in the axial operating force, the deterioration of the contacting parts, and the risk of the mechanism seizing.

The scraping seal may also serve to hold a lubricant interposed between the operating element and the guide tube in the case of a mechanically controlled thrust bearing. In the case of a hydraulically controlled thrust bearing, the scraping seal also serves to prevent oil from leaking in the direction of the friction linings of the clutch disc, as such leaks could give rise to problems with the operating of the clutch, such as slipping or juddering.

Hydraulically controlled self-centring release bearings fitted with a scraping seal are described, for example, in document WO-A-96/24782. This type of thrust bearing requires several special components for acting as the scraping seal, for sealing the bearing, and for providing the self-centering connection. What is more, the bearing has a complicated shape and is relatively bulky in the radial direction.

Also known from the prior art is document FR-A-2,663,702 which relates to a clutch-release bearing equipped with an elastic self-centering connecting sleeve which has a front lip that forms a seal for the bearing. A release bearing of this kind has no scraping seal.

The object of the present invention is to overcome the drawbacks of the above devices.

Also, the subject of the present invention is a device for operating a clutch which provides an effective and inexpensive seal between the guide tube and the operating element.

The device for operating a clutch, according to the invention, is of the type comprising a thrust ball bearing, equipped with a non-rotating race and with a rotating race, capable of acting on a diaphragm of a clutch mechanism, an operating element comprising a tubular portion and a radial flange, which can move axially along a guide tube, and an elastic self-alignment member arranged radially between the thrust ball bearing and the tubular portion of the operating element. The elastic self-alignment member comprises an annular scraping lip which rubs against the guide tube to form a scraping seal. This thus provides a sealing element which is inexpensive and simple to mount, preventing the ingress of dirt between the operating element and the guide tube during the relative axial movement of these two parts under the action of an operating device, and also preventing any possible leaks of lubricant or of oil.

In one embodiment of the invention, the scraping lip is directed axially towards the clutch mechanism and radially towards the inside in order to provide good scraping.

Advantageously, the elastic self-alignment member and the scraping lip are of one piece. This then makes the device easier to mount while at the same time reducing the costs of manufacture.

In one embodiment of the invention, the elastic self-alignment member comprises a sleeve in contact with the bore of the non-rotating race of the thrust ball bearing. The bore of the sleeve has a number of ribs projecting radially towards the inside and extending axially along the width of the sleeve. The ribs are inclined and are in the form of strips, the free ends of which rest on the tubular portion of the operating member in order to achieve good self-centering.

Advantageously, the elastic self-alignment member comprises an additional annular lip which provides a seal between the non-rotating and the rotating races of the thrust ball bearing so that the said member fulfils three functions in an economic way.

In one embodiment of the invention, the free end of the tubular portion of the operating member comprises an annular bulge directed radially outwards to form an axial stop for the elastic self-alignment member. The thrust ball bearing is thus secured axially to the operating element. This securing is easy to achieve, the bearing fitted with the self-alignment member being mounted by sliding it in axially.

As a preference, the scraping lip is in contact with a bearing surface of the free end of the tubular portion of the operating member. The bearing surface may be oblique, for example at 45° forming a chamfer on the free end of the tubular portion and makes it possible to prevent any inverting of the scraping lip as the operating element moves relative to the guide tube. The bearing surface may advantageously be produced by means of the bulge on a surface thereof that faces the diaphragm but it is of course possible to provide the said bearing surface independently of the annular bulge, whether or not the latter exists.

The elastic self-alignment member may be secured to the non-rotating race by means of mating shapes, but securing may just as well be achieved by overmoulding or by bonding the said member into the said race.

The clutch-operating device may be mechanically, electro-mechanically or hydraulically controlled.

Thus an elastic self-alignment member capable simultaneously of fulfilling at least the functions of providing a self-centering connection and of a scraping seal is produced simply and economically, and this makes it possible to produce the number of parts and to simplify the bearing, the races of which are advantageously made of pressed sheet metal.

The invention will be better understood from studying the detailed description of a number of embodiments taken by way of non-limiting example and illustrated by the appended drawings in which.

Figure 1:
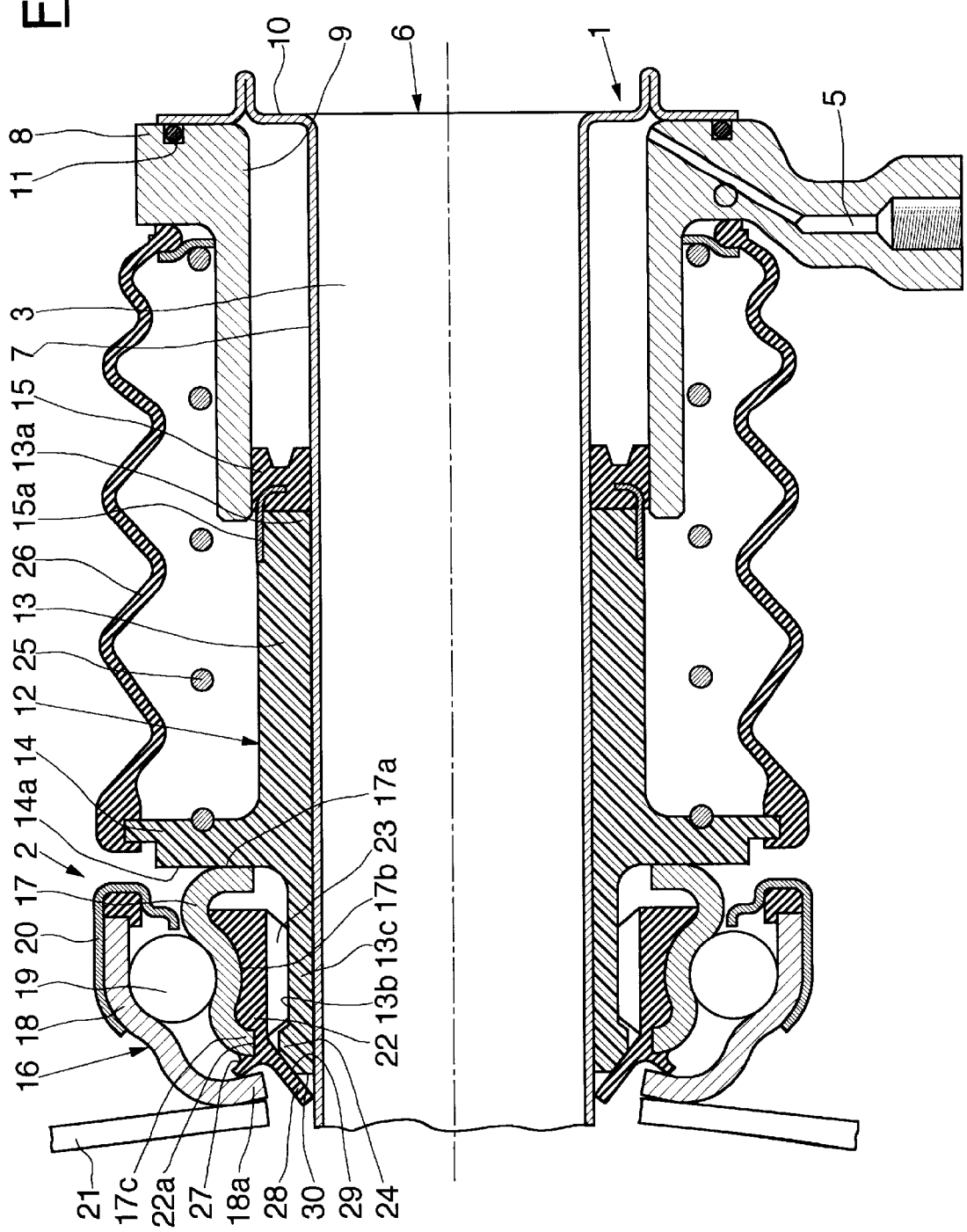
FIG. 1 is a view in axial section of a device according to a first embodiment of the invention.

As illustrated in FIG. 1, the clutch operating device is equipped with a hydraulic control device comprising a fixed part 1 and a moving part 2. The fixed part 1 is, in general, mounted on a gearbox casing, not depicted. The fixed part 1 also comprises an annular chamber 4 intended to contain a hydraulic fluid introduced via an orifice 5. The fixed part 1 comprises a guide tube 6 made of sheet metal, the interior cylindrical surface of which forms a bore 3 and the exterior cylindrical surface 7 of which forms a wall of the chamber 4. The fixed part 1 also comprises an external body 8 concentric with the guide tube 6 and the bore 9 of which forms a second wall of the chamber 4. The end face of the chamber 4 is formed by one end of the guide tube 3 which is pressed to form a radial portion 10 extending outwards into contact with the outer body 8. An annular seal 11 is provided, fitted between the radial portion 10 of the guide tube 3 and the outer body 8. In one embodiment, the outer body 8 has lugs for attaching it to the gearbox casing, the radial portion 10 of the guide tube 3 being trapped between the body and the casing. As an alternative, the said portion 10 is attached to the said body by crimping, screwing or some other means.

The moving part 2 comprises an operating element 12 forming a piston produced by moulding a synthetic material such as a plastic, or metallic substance, for example an aluminium-based one, and mounted on the outer surface 7 of the guide tube 3. The operating element 12 comprises a tubular portion 13 and a radial flange 14. The tubular portion 13 has one end 13a provided with an annular seal 15 which is located in the chamber 4. The seal 15 and the end 13a of the tubular portion 13 are secured together by means of a metallic element 15a in the form of a cup. The operating element 12 can move axially with respect to the fixed part 1 under the effect of the pressure of the fluid introduced into the chamber 4 by the orifice 5.

The operating element 13 axially closes the chamber 4 which is thus a variable-volume chamber.

The moving part 2 also comprises a thrust ball bearing 16 provided with a non-rotating inner race 17, a rotating outer race 18, the races 17 and 18 being concentric and made of pressed sheet metal, with a row of rolling bodies 19 in the form of balls and with a sealing element 20 secured to the outer race 18 and extending close to the inner race 17. A free end 18a of the outer race 18 is in local contact with the ends of the fingers of the clutch diaphragm 21 in order to exert an axial thrust thereon.

Figure 3:
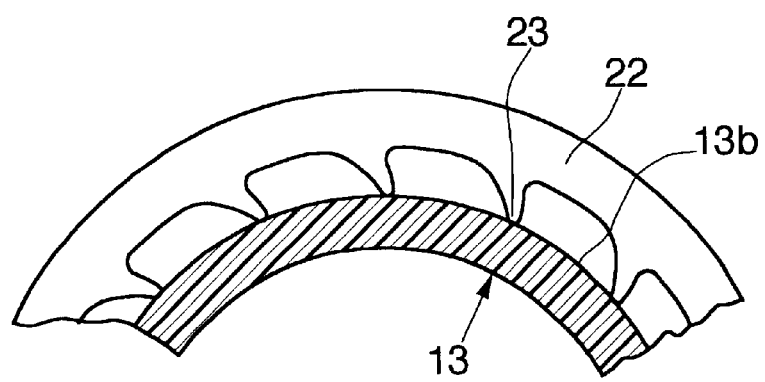
FIG. 3 is a view in cross-section of the elastic self-alignment member and of the operating element of FIG. 1 and of FIG. 2.

A radial surface 17a of the inner race 17 is in contact,with a radial surface 14a of the radial flange 14 which acts as an axial thrust surface for the bearing 16 in one direction. The radial surface 17a is directed radially towards the inside. An elastic sleeve 22 is placed in the bore formed by the interior surface 17b of the inner race 17 opposite the rolling bodies 19. Sleeve 22 is secured to the non-rotating inner race 17 by bonding or overmolding. The sleeve 22 on its bore comprises radial projections 23 of the same width as the said sleeve 22 and which come into contact with the exterior surface 13b of the free end 13c of the tubular portion 13 which is the opposite end to the free end 13a. The radial projections 23 are elastic and can deform radially. The projections 23 of the sleeve 22 are in the form of axial elastic ribs in the form of strips which are inclined with respect to a plane passing through the axis of the device so as to increase their radial elasticity, see FIG. 3. This inclination of the projections 23 makes self-centering of the thrust ball bearing 16 easier. The thrust ball bearing 16 can thus move radially with respect to the operating element 12, rubbing against the surface 14a of the radial flange 14.

The axial connection between the sleeve 22 and the inner race 17 is provided by mating shapes of an annular groove 22a formed at one end of the sleeve and a radial turned back portion 17c directed towards the inside formed at the end of the inner race directed towards the diaphragm.

The free end 13b of the tubular portion 13 comprises an annular bulge 24 projecting radially outwards. The projections 23 of the sleeve 22 are arranged axially between the bulge 24 and the radial flange 14. The bearing 16 is axially secured to the operating element 12 thanks on the one hand to the fact that the projections 23 are in abutment against the bulge 24 and, on the other hand, to the fact that the radial surface 17a of the inner race 17 is in abutment with the radial surface 14a of the radial flange 14.

Arranged between the outer body 8 of the fixed part 1 and the radial flange 14 are a spring 25 which thrusts axially so as to make the thrust bearing rest on the diaphragm 21 with a certain preload. The spring 25 is surrounded by a protective bellows 26 which prevents the ingress of foreign bodies near the spring 25 and the entry to the chamber 4.

The sleeve 22 projects axially into the space left free between the bulge 24 and the inner race 17 and is prolonged by an annular sealing lip 27 which rubs against the internal surface of the free end 18a of the outer race 18. The lip 27 is directed axially towards the diaphragm and radially outwards, the races 17 and 18 being made of sheet metal which is pressed and treated to give it the required hardness.

The free end 18a here is rounded and interacts via its outer surface with the diaphragm fingers, the ends of which are flat. Leaktightness of the bearing 16 is thus ensured. The sleeve 22 is also prolonged by an inclined scraping lip 28 directed axially towards the clutch diaphragm and radially scraping and rubbing on the outer surface 7 of the guide tube 3. This thus prevents the ingress of foreign bodies between the tubular portion 13 and the outer surface 7 of the guide tube 3. The sleeve 22, the sealing lip 27 and the scraping lip 28 thus form a one-piece assembly which can be obtained in a single operation by moulding an elastomer or equivalent supple material.

Beyond the bulge 24, and adjacent to it, the free end 13c of the tubular portion 13 has a chamfer 29 and a radial surface 30 which meets the outer surface 7 of the guide tube 3. This thus gives a bearing surface formed on the surface of the bulge that faces the diaphragm. The scraping lip 28 rests against the chamfer 29 so as to increase its stability with respect to the outer surface 7 of the guide tube 3 and improve the scraping. Thus, even when the thrust bearing 16 is off-centred with respect to the guide tube 3 and to the operating element 12, the scraping lip 28 remains in contact with the outer surface 7 of the guide tube 3 and prevents the ingress of foreign bodies. The fact that the scraping lip 28 bears against the chamfer 29 makes it possible to avoid any inversion of the scraping lip 29 as the moving part 2 moves towards the clutch diaphragm 21.

Figure 2:
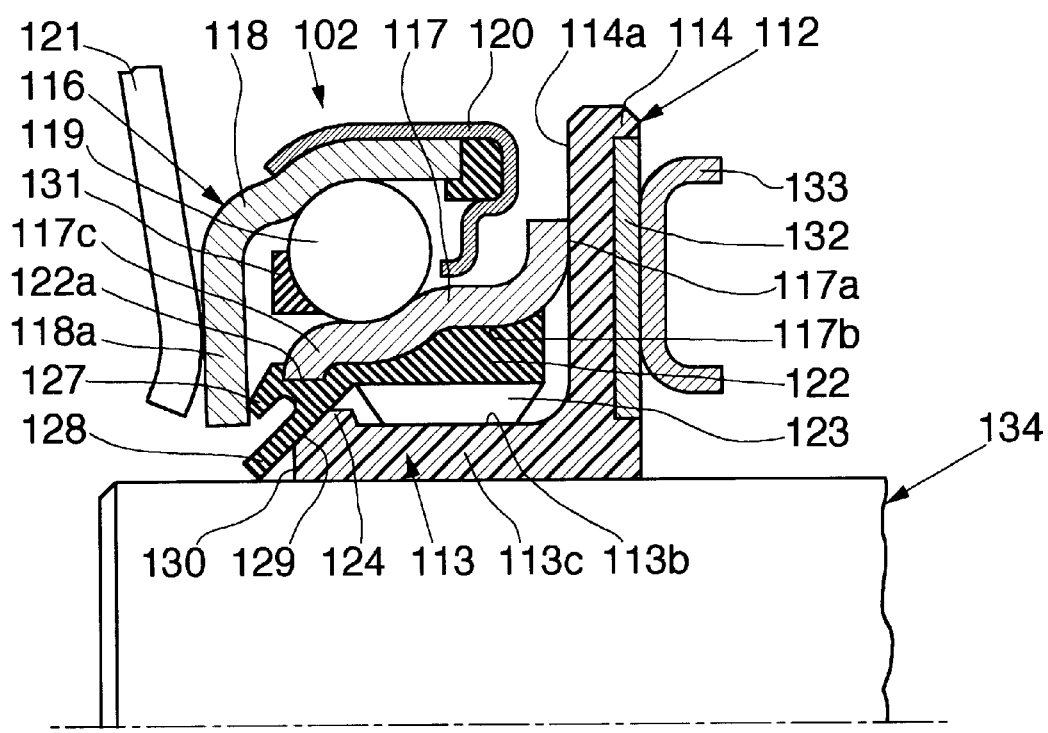
FIG. 2 is a view in axial half-section of a device according to a second embodiment of the invention.

The clutch operating device illustrated in FIG. 2 is of the mechanically controlled type. The references of elements which are similar to those of the embodiment of FIG. 1 have been increased by the number 100.

The operating element 112 comprises a tubular portion 113 which extends only on the same side as the bearing 116. The bearing 116 has a cage 131 for holding the rolling bodies 119. The radial flange 114 on its radial surface 114b which is the opposite one to the radial surface 114a has a metal bearing plate 132 of annular shape over which the said radial flange 114 is moulded. This plate 132 which has preferably been surface-hardened, acts as a contact surface for an operating member 133 which exerts a force in the axial direction to cause the thrust bearing in its entirety to move during a clutch-release operation.

The tubular portion 113 slides axially with respect to a fixed guide tube 134. The sleeve 122 is similar to the one in FIG. 1. The sealing lip 127 in contact with the internal surface of the free end 118a of the outer race 118 extends radially towards the inside unlike in FIG. 1, and this enhances the effectiveness of the seal and prevents the ingress of foreign particles into the bearing. Here, the free end 118a is flat and interacts, by means of its outer surface, with the ends of the diaphragm fingers, which have a convex shape. The sleeve 122 comprises, near the sealing lip 127, an annular groove 122a which, through mating shapes, mates with a radial turned-back portion 117c directed towards the inside and formed at the end of the inner race 117 directed towards the diaphragm. This then axially secures the sleeve 122 and the inner race 117 together. The radial surface 117a is directed radially outwards.

Thanks to the invention, an elastic self-alignment member is produced which self-centers the thrust bearing with respect to the operating element, the sealing between the two races of the thrust bearing and the scraping on the outer surface of the guide tube thus guaranteeing correct sliding of the operating member on the guide tube without the risk of seizure or leaks.

It will be appreciated that the bearing has a simple shape by comparison with those of the prior art, because the non-rotating race has a short radial surface 17a, 117a.

What is claimed is:

1. Device for operating a clutch, the device comprising:
   a thrust ball bearing, equipped with a non-rotating race and with a rotating race, capable of acting on a diaphragm of a clutch mechanism,
   a fixed guide tube means,
   an operating element including a tubular portion and a radial flange portion extending substantially radially, the operating element being movable axially along the guide tube means, and
   an elastic self-alignment member arranged radially between the thrust ball bearing and the substantially tubular portion of the operating element and located adjacent an interior surface of the non-rotating race and secured to the non-rotating race, the elastic self-alignment member including an annular scraping means which rubs against the guide tube means to form a scraping seal, wherein the scraping means is in contact with a bearing surface of a free end of the tubular portion of the operating element.

2. Device according to claim 1, wherein the scraping means is directed axially toward the clutch mechanism and radially towards the guide tube means.

3. Device according to claim 1, wherein the elastic self-alignment member and the scraping means form a one-piece assembly.

4. Device according to claim 1, wherein the elastic self-alignment member includes a sleeve in contact with the non-rotating race of the thrust ball bearing, a bore of the sleeve has a number of ribs projecting radially towards the guide tube means and extending axially along the width of the sleeve, the ribs are inclined and are in the form of strips, and have free ends which rest on the tubular portion of the operating member.

5. Device according to claim 1, wherein the elastic self-alignment member includes an additional annular lip which provides a seal between the non-rotating and the rotating races of the thrust ball bearing.

6. Device according to claim 1, wherein a free end of the tubular portion of the operating element includes an annular bulge directed radially outwards to form an axial stop for the elastic self-alignment member.

7. Device according to claim 1, wherein the bearing surface is formed by a bulge on a surface thereof that faces the diaphragm.

8. Device according to claim 1, wherein the elastic self-alignment member is secured to the non-rotating race by means of mating shapes.

9. Device according to claim 1, wherein the elastic self-alignment member is secured to the non-rotating race by bonding or overmolding.

10. Device according to claim 1, wherein the device is mechanically controlled.

11. Device according to claim 1, wherein the device is hydraulically controlled.

* * * * *